July 13, 1948.                R. A. GOEPFRICH                2,445,061
                           HYDRAULIC BRAKE ACTUATOR
                         Original Filed March 24, 1944

INVENTOR
RUDOLPH A. GOEPFRICH
BY
                ATTORNEY

Patented July 13, 1948

2,445,061

UNITED STATES PATENT OFFICE 2,445,061

HYDRAULIC BRAKE ACTUATOR

Rudolph A. Goepfrich, South Bend, Ind., assignor to Bendix Aviation Corporation, South Bend, Ind., a corporation of Delaware Continuation of application Serial No. 527,865, March 24, 1944. This application filed June 20, 1946, Serial No. 677,952

8 Claims. (Cl. 188—152)

This invention relates to brakes, and particularly to the construction of hydraulic brake actuators or wheel cylinders. The present application is a continuation of my previously filed corresponding application Serial No. 527,865 now abandoned.

The application of hydraulic pressure to spread the ends of brake shoes causes the shoes to move outwardly from their normal or released position. If these shoes return to released position under the influence of a powerful force, they will usually hit the stop member or members which determine their released position with a heavy impact, creating a sound usually referred to as "click." An excessively heavy impact should be prevented if possible, both because of the strain on the structure, and because of the unpleasant noise.

The primary object of the present invention is to provide means for preventing "click" in a hydraulically actuated brake.

A related object of the present invention is to accomplish the primary object with a simple and inexpensive structure.

Yet another object of the present invention is to provide, in a hydraulic brake wheel cylinder having an internal anchor flange between the pistons, extensions on the inner ends of the pistons which enter the space defined by the inner diameter of the anchor flange and thereby reduce to a very small volume the space between the pistons in released position.

Figure 1:
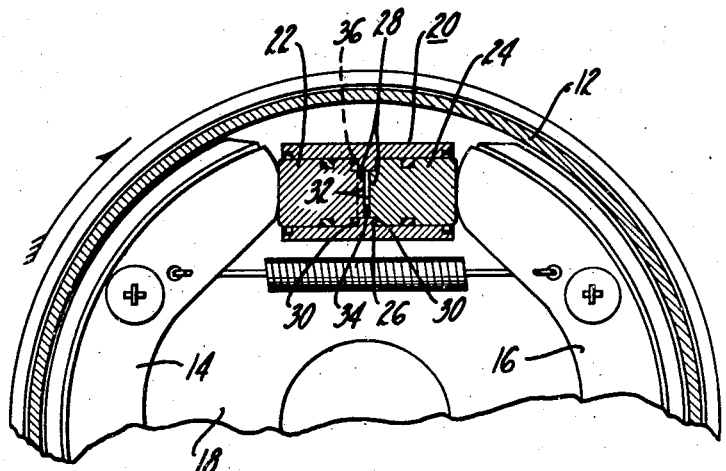
Figure 2:
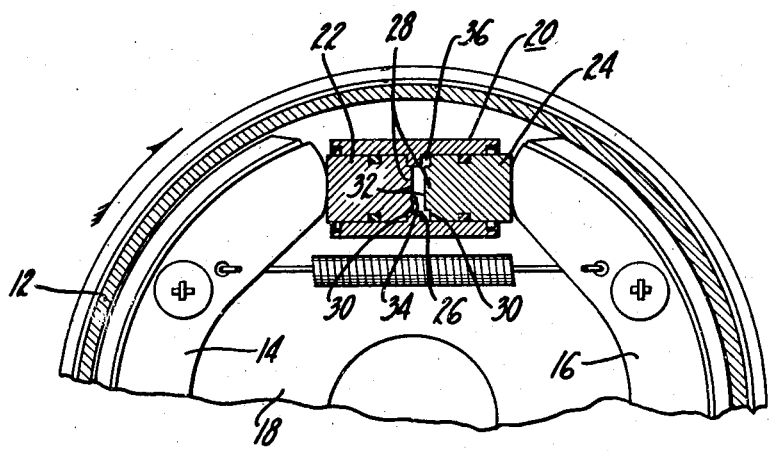

Other objects and advantages of the present invention will become apparent during the course of the following description, reference being had therein to the accompanying drawings, in which:

Figure 1 is a view of a portion of a brake assembly, showing a hydraulic actuator in section, the shoes and pistons of the brake being shown in released position; and Figure 2 is a view similar to Figure 1, except that the shoes and pistons are shown in applied position.

Referring to the drawing, a brake drum having an annular braking flange 12 is adapted to have its rotation slowed or stopped by means of friction elements or shoes 14 and 16, of which the upper ends only are shown. The shoes are mounted on a non-rotatable member 18.

The brake may be of any known type, insofar as the presence or absence of self-energization or servo action is concerned. However, the invention will not be particularly valuable in a brake of the non-servo type, i. e. a brake having two shoes permanently anchored opposite the actuator, because the only force drawing the applied ends of the shoes toward released or anchored position is the force of the brake retracting springs.

In brakes having two shoes, each of which is capable of anchoring at either end depending on the direction of drum rotation, and particularly in brakes having two shoes which are pivotally connected at their unanchored ends to constitute a single full-wrapping friction element, the invention will be very useful owing to the fact that the anchoring torque acting on the friction element or shoe exerts a powerful force moving it toward anchored position.

The applying pressure, in brakes of the types described in the preceding paragraph, usually causes both ends of the friction element initially to move outwardly into contact with the drum, and it is only after the friction element has come into contact with the drum that said friction element is driven back to its anchored position.

The anchoring torque of the shoes 14 and 16 is eventually taken by the support member 18. The torque may be transmitted to the support member 18 through the intermediary of any suitable anchor. In the illustrated brake, a very simple anchoring arrangement is shown, wherein the hydraulic actuator or wheel cylinder 20, which may be suitably bolted or otherwise secured to the support member 18, receives and transmits the anchoring force of the shoe to said support member. The cylinder 20 thus serves both as actuator and as anchor for the shoes. Furthermore, the anchoring force of the shoe may be received by the cylinder 20 by means of any desired structural arrangement. A cap might be provided which would transmit the anchoring torque directly from the respective shoe to the wall of cylinder 20, such for example as the arrangement shown in Humphrey Patent No. 2,258,893, or the pistons 22 and 24, which are reciprocable in the cylinder 20, might have flanges on their outer ends in anchoring contact with the outer ends of the cylinder such for example as the arrangement shown in Figure 6 of Goepfrich and White application Serial No. 444,636, filed May 27, 1942, now Patent No. 2,379,144, June 26, 1945.

In the illustrated brake, a convenient anchoring arrangement is used, the pistons 22 and 24 being arranged to transmit the anchoring torque of the shoes to a centrally located flange 26 extending inwardly toward the center of the cylinder 20, and preferably annular in form. The exact location of the flange 26 is not important except that it must be located between the pistons 22 and 24. Since, in the present case, it is considered desirable to use identical pistons, the anchor flange 26 is located at the center of the cylinder. Although the flange 26 is shown as being an integral part of the cylinder 20, this being a particularly satisfactory construction, it would also be possible to use, as the anchor or stop member for the pistons, a ring-shaped member formed separately from the cylinder and retained therein in any suitable manner.

Each of the pistons 22 and 24 has a cylindrical extension 28 on its inner end, the diameter of the inner extension being substantially the same, i. e., only slightly less than the inner diameter of the annular flange 26. When the pistons are in released position with their respective shoulders 30 resting against the sides of the annular flange 26, the inner ends 32 of the cylindrical extensions 28 are slightly spaced from one another, permitting the ingress of hydraulic fluid under pressure to the center of the cylinder. A hydraulic inlet passage 34 opens into the space between the cylindrical extensions 28, in order that fluid under pressure may be brought in from a master cylinder or other pressure creating device. The annular anchor flange 26 is made sufficiently wide to accommodate passage 34, and also to permit each cylindrical extension 28 to extend an appreciable distance beyond the side of the anchor flange which receives braking torque from the respective piston.

Operation of my improved "click" preventing hydraulic cylinder is as follows: As long as the brake remains released, the shoes and piston remain in the position illustrated in Fig. 1. When pressure is created to apply the brakes, liquid under pressure enters through inlet 34 and, acting on the inner faces of the pistons 22 and 24, forces both of them outwardly to move the shoes into contact with the brake drum. As soon as the shoes have come into contact with the drum, one of them will be forced by the well-known frictional drag or wrapping action of the drum to move back toward the center of the cylinder 20, pushing the associated piston back toward its anchor. Assuming, for purposes of illustration, that the drum is rotating in the direction indicated by the arrow, the shoe 14 will be forced by the brake drag to its anchored position. This means that the piston 22 will take the position shown in Fig. 2, while piston 24 will remain spaced from its anchor. As the piston 22 moves from its outermost position back toward its anchored position, the innermost edge 32 of piston 22 will enter the reduced diameter bore formed by the inner diameter of the anchor flange 26 while the anchoring shoulder 30 of piston 22 is still in the dotted-line position shown in Fig. 1, and piston 22 is therefore unanchored. This will substantially trap that portion of the fluid which is being forced out of the annular chamber 36, except that this fluid may pass between the inner diameter of the anchor flange 26 and the outer cylindrical surface of the extension 28. Because the clearance between the extension 28 and the flange 26 is very slight, flow of liquid from chamber 36 will be restricted, and this restriction of flow will have a dash-pot effect on movement of the piston 22, slowing its movement and permitting it to seat on the anchor flange without shock.

In order for my improved device to prevent "click," it is not necessary that the pistons anchor on the annular flange 26, since the restriction of the flow of liquid would be equally advantageous regardless where the anchoring torque of the shoe is received.

It will be noted that my improved wheel cylinder and piston construction, in addition to providing means for cushioning anchoring movement of the pistons, also reduces the volume of the center space of the cylinder to a minimum, thereby holding the operating quantity of liquid to a particularly small volume. This is advantageous because, during braking, exceptionally high temperatures are developed in the brake assembly, heating and tending to boil the liquid in the wheel cylinders. The difficulty caused by excessive heat can be markedly reduced by reducing the amount of liquid in the cylinder to a minimum. This reduces the amount of liquid subject to vaporization, and increases the relative amount of liquid subject to cooling influences in the conduits and other portions of the system not affected by brake heat.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. In a brake structure having a friction element which is adapted to be alternatively applied and anchored at the same end depending upon the direction of drum rotation, a hydraulic actuator having a piston therein operatively associated with the friction element, a ring-shaped stop member for said piston located inside said actuator, and a reduced diameter extension on the inner end of said piston having a diameter only slightly less than the inner diameter of the ring-shaped stop member, said reduced diameter extension and said stop member constituting a restriction to limit the rate of flow of fluid toward the inner end of the piston as the piston moves to seat on the stop member under the influence of the anchoring torque of the friction element.

2. A hydraulic motor comprising a cylinder having a centrally located inwardly extending annular flange, said cylinder and flange having an inlet passage therein, and two pistons reciprocable in said cylinder and located on opposite sides of said flange, each of said pistons having on the inner end thereof a cylindrical projection of slightly less diameter than the inner diameter of the inwardly extending flange, to form with said flange a restriction which limits the rate of flow of liquid toward the center of the flange as the piston moves toward the center of the cylinder, the inner ends of the projections on the pistons being only slightly spaced from one another when the pistons are in released position.

3. In a brake structure having a shoe which is adapted to be alternatively applied and anchored at the same end depending upon the direction of drum rotation, a hydraulic actuator comprising a cylinder having a chamber therein, a piston reciprocable in the cylinder which displaces fluid into said chamber in one direction of movement, said piston being operatively associated with said shoe in such manner that movement of the shoe to anchor causes the piston to displace fluid into said chamber as aforesaid, and a restriction limiting the rate of flow of fluid to said chamber during movement of said shoe to anchor, said restriction being constituted by an internally projecting annular flange in the cylinder and a reduced diameter extension on the inner end of the piston which enters said annular flange with a clearance insufficient to permit free flow of the fluid toward the aforesaid chamber.

4. In a brake structure having a shoe which is adapted to be alternatively applied and anchored at the same end depending upon the direction of drum rotation, a hydraulic actuator comprising a cylinder having a chamber therein, said hydraulic actuator providing an anchor for said shoe, a piston reciprocable in the cylinder which displaces fluid into said chamber in one direction of movement, said piston being operatively associated with said shoe in such manner that movement of the shoe to anchor causes the piston to displace fluid into said chamber as aforesaid, and a restriction limiting the rate of flow of fluid to said chamber during movement of said shoe to anchor, said restriction being constituted by an internally projecting annular flange in the cylinder and a reduced diameter extension on the inner end of the piston which enters said annular flange with a clearance insufficient to permit free flow of the fluid toward the aforesaid chamber.

5. In a brake, a hydraulic actuator comprising a cylinder, two pistons reciprocable in the cylinder, an internally projecting area-reducing member in the cylinder between the two pistons, and reduced cross-section extensions on the inner ends of the pistons which enter said area-reducing member and largely fill the space between the pistons.

6. In a brake, a hydraulic actuator comprising a cylinder, two pistons reciprocable in the cylinder, an internally projecting annular flange in the cylinder, and reduced diameter extensions on the inner ends of the pistons which enter said annular flange and largely fill the space inside said flange.

7. In a brake, a hydraulic actuator comprising a cylinder, two pistons reciprocable in the cylinder, a ring-shaped stop member for said pistons located inside said actuator between the pistons, and a reduced diameter extension on the inner end of each piston having a diameter only slightly less than the inner diameter of the ring-shaped stop member and having a length such that the combined volume of the extensions of the two pistons substantially fills the space inside the ring-shaped stop member whenever both pistons are seated against said stop member.

8. A hydraulic motor comprising a cylinder, a centrally located inwardly extending anchor flange having a circular opening therethrough, and two pistons reciprocable in said cylinder and located on opposite sides of said flange, each of said pistons having on the inner end thereof a cylindrical projection of slightly less diameter than the inner diameter of the flange, the inner ends of the projections being only slightly spaced from one another when the pistons are in released position.

RUDOLPH A. GOEPFRICH.

REFERENCES CITED

The following references are of record in the file of this patent:

UNITED STATES PATENTS

| Number | Name | Date |
| --- | --- | --- |
| 244,092 | Thayer | July 12, 1881 |
| 1,918,354 | Urbanek | July 18, 1933 |
| 2,293,167 | Overbeke | Aug. 18, 1942 |
| 2,336,352 | Goepfrich | Dec. 7, 1943 |